(12) United States Patent
Irwan et al.

(10) Patent No.: US 10,581,865 B1
(45) Date of Patent: Mar. 3, 2020

(54) INLINE FILTERING TO SECURE ACCESS AND DATA BETWEEN USER AND APPLICATION TO DEVICE AND BETWEEN DEVICE TO DEVICE

(71) Applicant: Xage Security, Inc., Palo Alto, CA (US)

(72) Inventors: Susanto Junaidi Irwan, San Francisco, CA (US); Roman M. Arutyunov, San Jose, CA (US); Ganesh B. Jampani, San Francisco, CA (US); Dhananjayan Santhanakrishnan, Sunnyvale, CA (US)

(73) Assignee: Xage Security, Inc., Palo Alto, CA (US)

( * ) Notice: Subject to any disclaimer, the term of this patent is extended or adjusted under 35 U.S.C. 154(b) by 0 days.

(21) Appl. No.: 16/280,701

(22) Filed: Feb. 20, 2019

(51) Int. Cl.
*H04L 29/06* (2006.01)
*H04L 29/08* (2006.01)

(52) U.S. Cl.
CPC ........ *H04L 63/102* (2013.01); *H04L 63/0428* (2013.01); *H04L 63/0876* (2013.01); *H04L 63/20* (2013.01); *H04L 67/1097* (2013.01); *H04L 67/125* (2013.01); *H04L 67/14* (2013.01); *H04L 67/2809* (2013.01)

(58) Field of Classification Search
CPC ............... H04L 63/102; H04L 63/0428; H04L 63/0876; H04L 63/20; H04L 67/1097; H04L 67/125; H04L 67/14; H04L 67/2809; H04L 2209/38; H04L 9/32; H04L 9/3236; H04L 63/101; G06F 11/3072; G06F 11/3476
See application file for complete search history.

(56) References Cited

U.S. PATENT DOCUMENTS

| 2012/0303949 A1* | 11/2012 | Liu ..................... H04L 63/0272 713/153 |
| 2017/0289134 A1* | 10/2017 | Bradley ................ H04L 63/102 |
| 2018/0278637 A1* | 9/2018 | Kuperman .......... H04L 12/2803 |

* cited by examiner

*Primary Examiner* — Yogesh Paliwal
(74) *Attorney, Agent, or Firm* — Hickman Palermo Becker Bingham LLP; Tina T. Wang

(57) ABSTRACT

A computer-implemented method comprises posting, by a broker computing device, identity awareness data for a plurality of client computing devices to a distributed data repository (DDP); receiving, by a networking hardware device, the identity awareness data from the DDP; using, by the networking hardware device, the identity awareness data from the DDP to authenticate a client computing device requesting access to at least one Internet of Things (IoT) computing device; in response to authenticating the client computing device, creating, by the networking hardware device, a session for the client computing device to communicate with the at least one IoT computing device, wherein creating a session comprises: opening a port on the networking hardware device, wherein communication between the client computing device and the at least one IoT computing device is through the port; posting information relating to the session as authentication session information to the DDP.

17 Claims, 6 Drawing Sheets

INLINE FILTERING TO SECURE ACCESS AND DATA BETWEEN USER AND APPLICATION TO DEVICE AND BETWEEN DEVICE TO DEVICE

TECHNICAL FIELD

One technical field of the present disclosure relates to methods, systems, computer software, and/or computer hardware in the field of network communications. Another technical field is computer-implement methods and systems for providing network access control services to prevent unauthorized traffic. Another technical field is controlling network access to internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured effectively, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

In existing systems, device applications remotely accessing IoT devices use an industrial protocol over serial or Ethernet without strong, or any type of, authentication. In some security approaches, a device application may include a locking mechanism to prevent an IoT device from being accessed by other users. This traditional approach is susceptible to vulnerabilities as IoT devices can be locked by anyone, including "bad" actors, on the network. For example, malware, instead of the appropriate application, may lock the IoT device. Once the IoT device is locked, the IoT device cannot be controlled by others unless it becomes unlocked. Furthermore, in existing systems, communications between IoT devices are not secured as these communications are transmitted in plain text, leaving them vulnerable to unauthorized eavesdropping. Anyone, including bad actors, listening on the network would be able to access the communications.

Thus, there is a need for an access control authority that securely enables network access based on authenticated sessions with devices and encrypted communications between devices.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:
  1.0 GENERAL OVERVIEW
  2.0 STRUCTURAL OVERVIEW
  3.0 FUNCTIONAL OVERVIEW
    3.1 BROKER
    3.2 DISTRIBUTED LEDGER OPERATIONS
    3.3 GATEWAY
  4.0 PROCEDURAL OVERVIEW
  5.0 HARDWARE OVERVIEW
  6.0 OTHER ASPECTS OF DISCLOSURE

1.0 General Overview

According to various embodiments, computer-implemented methods and systems are provided that enable user/application/user device identities and corresponding access control policies to be centrally managed and to be enforced by a gateway. Embodiments offer the benefit of not requiring different sources to separately provide these identities and access control policies at the gateway. In addition, connections sessions are created and saved by the gateway to prevent unauthorized access, based on location, function, type, and/or ownership, to devices including Internet of Things (IoT) devices that may have insufficient security features.

In an embodiment, a computer-implemented method comprises posting, by a broker computing device, identity awareness data for a plurality of client computing devices to a distributed data repository. The method further comprises receiving, by a networking hardware device, the identity awareness data from the distributed data repository, using, by the networking hardware device, the identity awareness data from the distributed data repository to authenticate a client computing device requesting access to at least one Internet of Things (IoT) computing device, and in response to authenticating the client computing device, creating, by the networking hardware device, a session for the client computing device to communicate with the at least one IoT computing device. Creating a session comprises opening a port on the networking hardware device, wherein communication between the client computing device and the at least one IoT computing device is through the port, and posting information relating to the session as authentication session information to the distributed data repository. When a session is authenticated, traffic between the client computing device and the at least one IoT computing device is allowed. When a session is not authenticated, traffic between the client computing device and the at least one IoT computing device may be blocked.

Other embodiments, aspects and features will become apparent from the remainder of the disclosure as a whole.

2.0 Structural Overview

Figure 1:
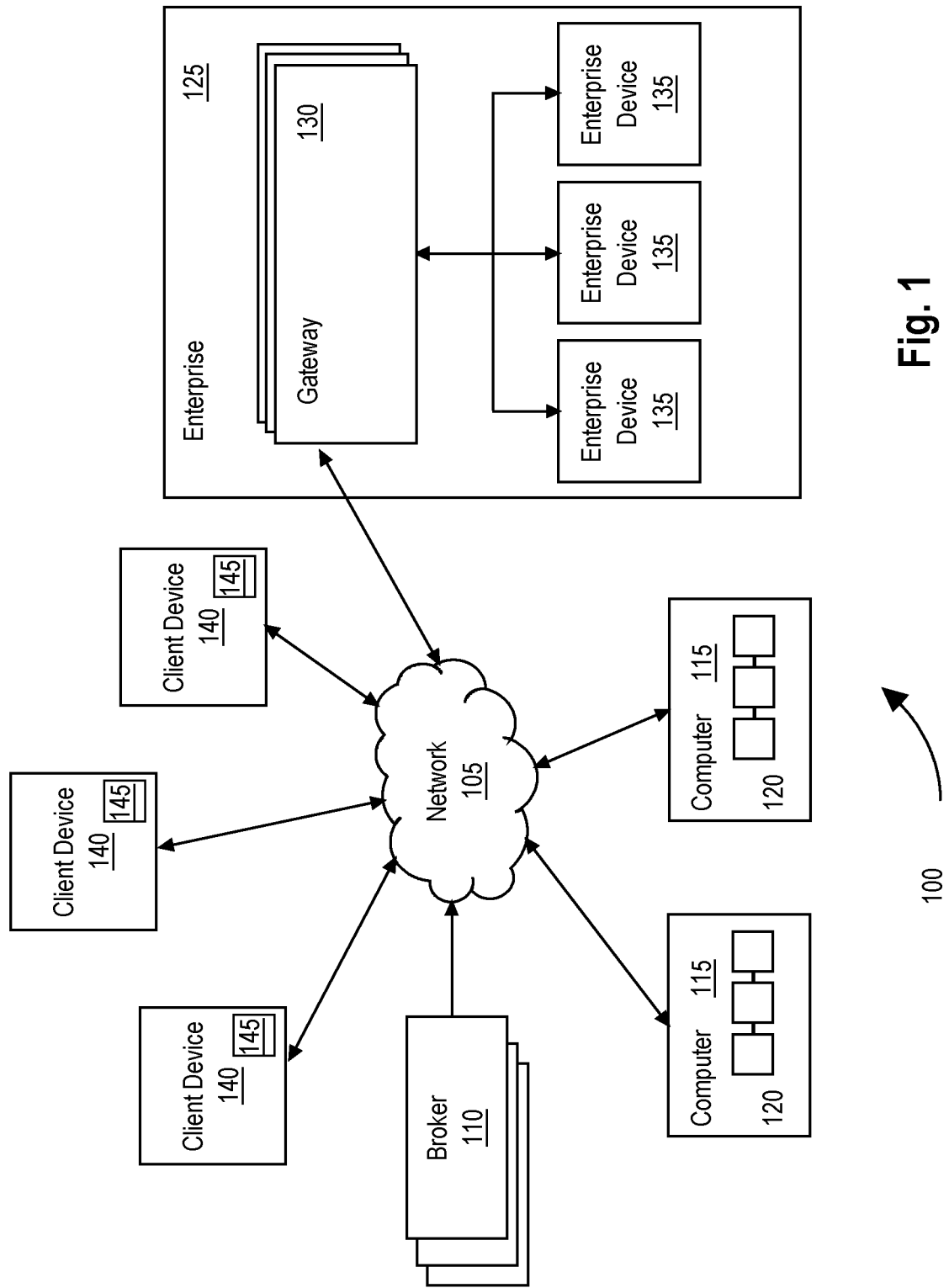
FIG. 1 illustrates an example networked computer system in accordance with some embodiments.

FIG. 1 illustrates an example networked computer system in accordance with some embodiments.

In some embodiments, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, Golang, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement.

In the example of FIG. 1, the computer system 100 may facilitate the secure exchange of data between programmed brokers 110, computers 115 of a distributed ledger, gateways 130, enterprise devices 135, and client devices 140. A gateway 130 may be in-line between a user/application (a client device 140) and an enterprise device 135 and/or between enterprise devices 135. For simplicity of illustration, client devices 140 are illustrated in FIG. 1 as being remotely located from, although client devices can instead be located within, an enterprise 125. In some embodiments, each of elements 110, 115, and 130 of FIG. 1 may represent one or more computers that host or execute stored programs that provide the functions and operations that are described further herein in connection with access control services and distributed ledger operations.

A broker 110 may be a computer, software and/or hardware or a combination storing instructions that are programmed or configured to access, from one or more directory services, identity awareness data, including but not limited to identities of users, applications, and/or client devices (for example, biometrics, multi-factor authentication, user names and/or user group names mapped to users' IP addresses, application protocols, port numbers, and/or any other application specific identity data) and their corresponding access control policies. For example, user identities may specify users who have access through the gateway 130 and user access control policies may control what the users can access. The broker 110 may also store instructions that are programmed or configured to access, from one or more device managing services, device security policies. In some embodiments, device security policies specify identities of and device controls for enterprise devices 135, as well encryption/decryption algorithms corresponding with these enterprise devices 135. In an embodiment, a graphical user interface (GUI) may be provided as part of the broker 110 to receive identity awareness data and/or device security policies as inputs from an administrator. The broker 110 generates hashes and encrypts the identity awareness data and the device security policies and sends the information over a network 105 to a digital distributed ledger 120 for storage.

A federation is a group of entities, such as directory services, agreeing upon standards of user identities and access control in a collective fashion. This allows directory services to delegate collective authority over, for example, one or more firewall implements, such as the gateway 130 or dedicated identity-based firewalls within the enterprise 125. In some embodiments, the broker 110 and other brokers 110 associated with the same federation, together, may generate hashes and encrypt all identity awareness data accessed from the directory services belonging in the same federation and send the information over the network 105 to the digital distributed ledger 120 for storage. In this manner, all identity awareness data is centrally managed by all brokers 110 associated with the same federation.

Network 105 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 105 and the disclosure presumes that all elements of FIG. 1 are communicatively coupled via the network 105. The various elements depicted in FIG. 1 may also communicate with each other via direct communications links that are not depicted in FIG. 1 for purposes of explanation.

The distributed ledger 120, such as a decentralized digital ledger, may comprise blocks of linked data that are stored in an interconnected network of computers, with suitable stored programs at those computers to support ordered creation and transmission of distributed ledger data. The distributed ledger 120 forms a distributed database that maintains a continuously growing list of ordered records, termed blocks, that are timestamped and linked to a previous block. Each block in the series of blocks is linked together chronologically, with each new block containing a hash of the previous block, such as in a blockchain. Each computer 115, or node, in a network of computers may store the entire record of linked data blocks. This creates a consensus network of computers that can verify the integrity of each block of data and the integrity of the distributed ledger 120. The consensus network has the benefit of having a high Byzantine fault tolerance, which is the ability of a computing system to tolerate Byzantine failures. As a result, the distributed ledger 120 functions as a distributed database that ensures the integrity of the data by utilizing hash functions to link each block to its previous block and storing the entire record of data blocks at each node.

Access control services may be computer-implemented services that are programmatically offered by the gateway 130. The gateway 130 may be a computer, software and/or hardware or a combination storing instructions configured to access the identity awareness data and the device security policies stored in the distributed ledger 120 and controls network access to traffic flowing to and from a private network, such as the enterprise 125, based on the identity awareness data and the device security policies to enforce user to device access, application to device access, and device to device access. For example, the gateway 130 may store a copy of the identity awareness data and the device security policies in a local database by periodically checking the distributed ledger 120 for updated data. The gateway 130 may use the identity awareness data and the device security policies to establish firewall rules at the gateway 130, which are used to control incoming and outgoing network traffic. In some embodiments, the gateway 130 may also periodically update the distributed ledger 120 with locally stored and updated information to the identity awareness data and the device security policies.

In some embodiments, the gateway 130 may also be configured to filter and apply role-based access control (RBAC) with rules to restrict network access of users based on roles of the users within the enterprise. For example, the gateway 130 may allow a user, according to the user's assigned role, to access only a subset of a plurality of enterprise devices 135 behind the gateway 130.

In some embodiments, the gateway 130 may be configured to access the identity awareness data stored in the distributed ledger 120 to actively manage one or more identity-based firewalls within the enterprise.

In some embodiments, the gateway 130 may be configured to generate and store authentication session information in the distributed ledger 120. The authentication session information stored in the distributed ledger 120 may be available to a plurality of gateways 130 within the enterprise such that a user is not required to authenticate manually to more than one of the gateways 130 within the enterprise. In an embodiment, the gateway 130, which authenticated the user, may provide the user with a token or an identity tag that is based on its access control policies. This token or identity tag may be included in a session header or payload and is enforced by other gateways or other enforcement points within the enterprise. In another embodiment, an authorizing entity, such as the distributed ledger 120, may provide the token or identity tag. By using this token or identity tag in the session header or payload, the user may be authenticated across the entire distributed deployment of gateways, creating a single sign on experience.

In some embodiments, the gateway 130 may include a transparent mode or a Layer 2 bridge mode to allow or block network packets depending on the authenticated session of the user.

A client device 140 may be a computer, a virtual computer, and/or a computing device located within or outside (remotely from) an enterprise 125. The client device 140 may also be other IoT devices, which are physical devices with network connectivity capabilities that enables these physical devices to collect and exchange data. The client device 140 may also be specific users using a computer or IoT device. The client device 140 may also be applications running on a computer or IoT device.

A client agent 145 configured to communicate with the gateway 130 and/or the distributed ledger 120, may be executed on a client device 140. The client agent 145 may encrypt and decrypt communication between the client device 140 and the gateway 130. The client agent 145 may also access authentication session information from the distributed ledger 120 and provide the data to the gateway 130.

An enterprise device 135 may be a computer, a virtual computer, and/or a computing device located within an enterprise 125. A computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 135 may be computer network devices such as gateways, modems, routers, wireless access points, switches, hubs, and firewalls. The enterprise device 135 may also be other IoT devices, which are physical devices with network connectivity capabilities that enables these physical devices to collect and exchange data. The enterprise device 135 may also be specific users using a computer or IoT device. The enterprise device 135 may also be applications running on a computer or IoT device. An enterprise device 135 may be located behind the gateway 130.

3.0 Functional Overview

In some embodiments, the broker 110, the distributed ledger 120, and the gateway 130 interoperate programmatically in an unconventional manner to provide an access control intermediary that continuously manages network access from the client devices 140, the enterprise devices 135, or both. In some embodiment, the gateway 130 is programmed to control network access by the client devices 140 using the identity awareness data and the authentication session information stored in the distributed ledger 120, and to control network access by the enterprise devices 135 using the device security policies stored in the distributed ledger 120. The broker 110, the distributed ledger 120, and the gateway 130 are programmed to or configured to copy, encrypt, distribute, store, transport, and/or monitor the identity awareness data, the authentication session information, and the device security policies in a secure manner so that the gateway 130 may perform network access controls using this data, as further described in other sections herein.

3.1 Broker

Figure 2:
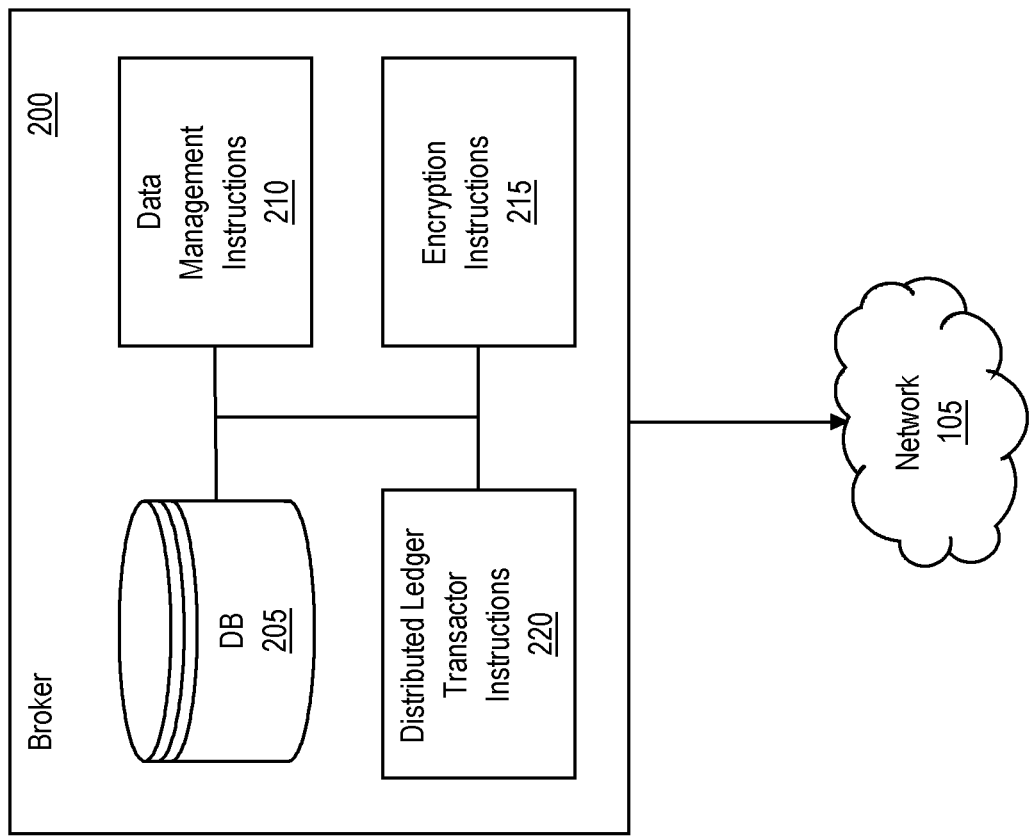
FIG. 2 illustrates an example broker in accordance with some embodiments.

FIG. 2 illustrates an example broker 200 in accordance with some embodiments. In some embodiments, the broker 110 of FIG. 1 is similarly configured as the broker 200. The broker 200 may be associated with a federation. The broker 200 may use a database 205 to store identity awareness data retrieved from one or more directory services in the federation using data management instructions 210. In some embodiments, the broker 200 is a dedicated broker for a single directory service in the federation. In some embodiments, the broker 200 is one of a plurality of brokers associated with the federation. The broker 200 may also use the database 205 to store device security policies retrieved from one or more device managing services using the data management instructions 210. In some embodiments, the broker 200 may receive the identity awareness data, the device security policies, or both as inputs via a graphical user interface (GUI) of the broker 110.

In some embodiments, the identity awareness data and the device security policies may be encrypted by encryption instructions 215. For example, the encryption instructions 215 may apply a hash algorithm, such as an MD5, Secure Hash Algorithm (SHA) 256, or any other hash function, to the identity awareness data to generate one or more hashed or encrypted data object elements. The hash may act as a numerical representation of an object element. Any hash function, as understood in the art, may be used. Any changes to the object element would change the hash, thereby creating differences in the current hash compared to a previous hash.

The one or more encrypted object elements are then sent over the network 105 to the distributed ledger 120 for storage using distributed ledger transactor instructions 220. The distributed ledger transactor instructions 220 update the distributed ledger 120 by creating one or more new blocks or entries in the distributed ledger 120.

3.2 Distributed Ledger Operations

The distributed ledger 120 functions as a decentralized digital ledger that tracks numerous entries. Copies of the entire distributed ledger may be stored at each computer 115, or node, in a distributed network of interconnected computers of which FIG. 1 illustrates computer 115 with distributed ledger 120. In an embodiment, proposed entries to the distributed ledger 120 may be checked by a majority of the computers for verification. For example, if a new entry is generated for storage in the distributed ledger 120, the network of interconnected computers that also store copies of the distributed ledger 120 would first run algorithms to evaluate the hash value and verify the validity of the entry. If a majority of the computers agree that the entry is valid, then the entry will be added as a new block in the distributed ledger 120. As a part of a consensus network, distributed ledger 120 enforces high Byzantine fault tolerance or an agreement among the computers; for example, a malicious attack attempting to alter the information in the distributed ledger 120 would need to control over 50% of the computers in the consensus network to alter the consensus. Since it would be exceedingly difficult to maliciously attack and maintain control over that many computers, the distributed ledger data is better protected against malicious attacks than traditional methods of data storage.

Figure 3:
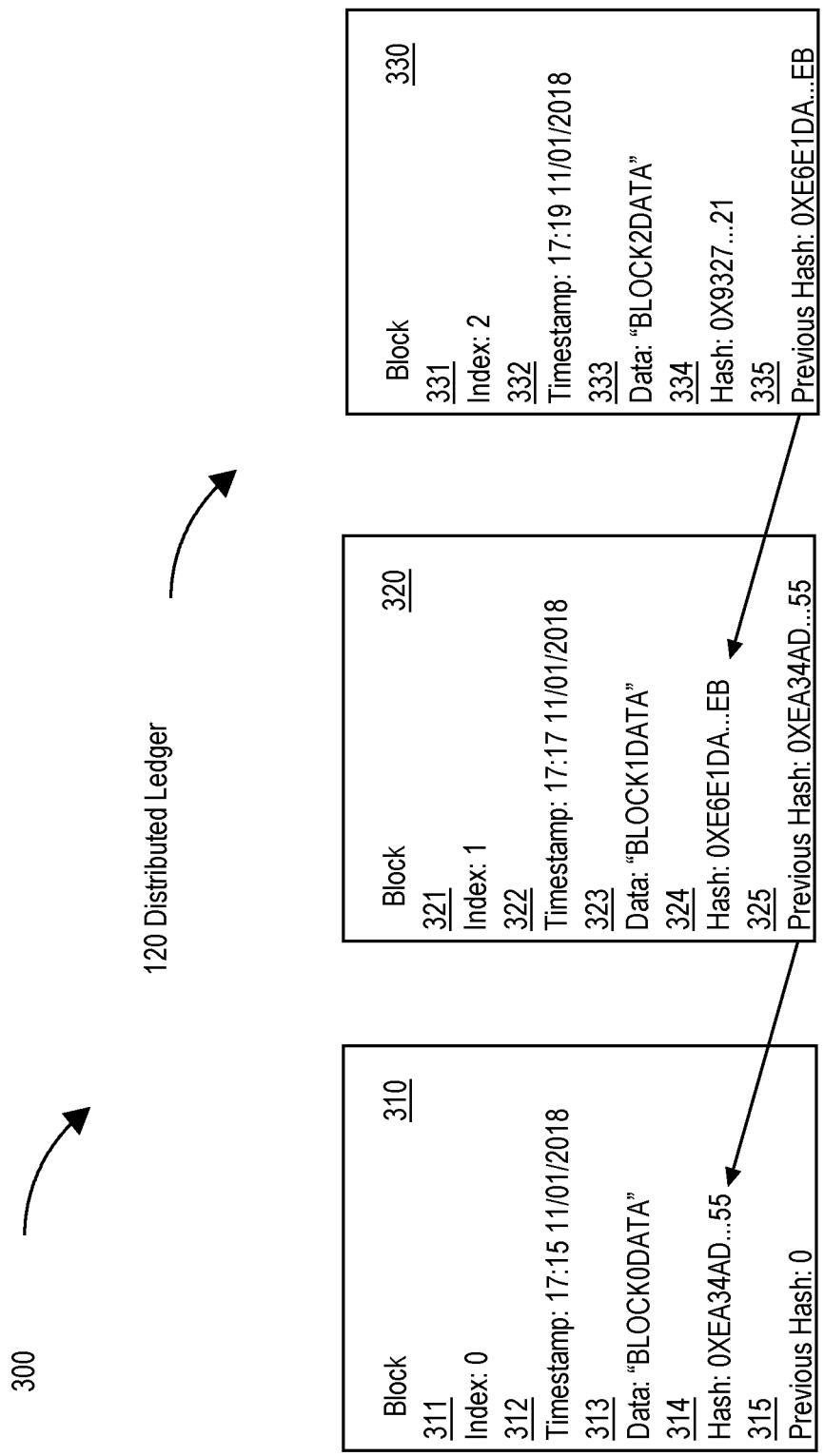
FIG. 3 illustrates an example distributed data repository in accordance with some embodiments.

FIG. 3 illustrates an example digital distributed data repository 300 in accordance with some embodiments. In an example embodiment, a digital distributed data repository 300 comprises the distributed ledger 120 having blocks 310, 320, 330. The distributed ledger 120 may include any number of blocks. In the example of FIG. 3, each block 310, 320, 330 may include its own index number 311, 321, 331, timestamp 312, 322, 332, data 313, 323, 333, hash 314, 324, 334, and previous hash 315, 325, 335.

The index number 311, 321, 331 may be a numerical index that indicates the block's placement in the chain. The timestamp 312, 322, 332 may be the date and time of when a block 310, 320, 330 is created. The data 313, 323, 333 may be an encrypted share stored as "block0data," "block1data," and "block2data" in the blocks 310, 320, 330, respectively. The hash 314, 324, 334 may be a hash of the encrypted rule or policy, such as an MD5 hash, SHA256 hash, or RIPEMD hash. The previous hash 315, 325, 335 may be the hash of the previous block, which links the blocks in sequence. In the example of FIG. 3, block 330 stores a record of previous hash 324, while block 320 stores a record of previous hash 314. These records of previous hashes link each new block to the previous block to form a chain that allows for integrity checks of each block.

3.3 Gateway

Figure 4:
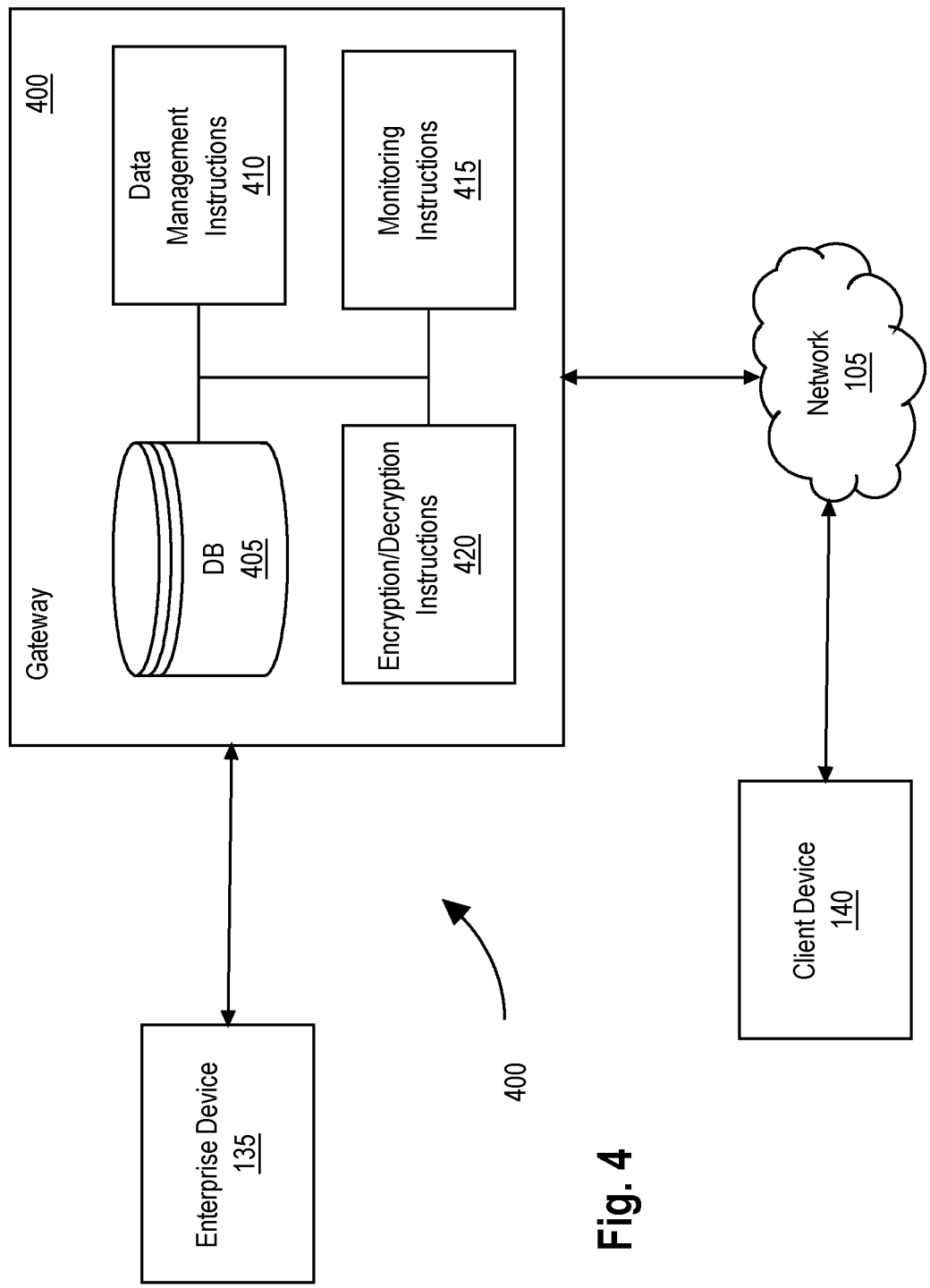
FIG. 4 illustrates an example gateway in accordance with some embodiments.

FIG. 4 illustrates an example gateway 400 in accordance with some embodiments. In some embodiments, the gateway 130 of FIG. 1 is similarly configured as the gateway 400.

The gateway 400, optionally, may have a database 405 that stores its corresponding identity awareness data that is stored in the broker databases 205 in brokers 200 associated with the same federation and/or the distributed ledger 120 and its corresponding device security policies that are stored in the distributed ledger 120. In some embodiments, data management instructions 410 may periodically check the distributed ledger 120 for data directly rather than using a local database 405 for storage. Alternatively, the data management instructions 410 may periodically check the distributed ledger 120 for updated data and store the updated data in the local database 405.

In some embodiments, the identity awareness data and the device security policies, and any changes to them, may be hashed and encrypted and stored in the distributed ledger 120 by the gateway 400. The gateway 400 uses the identity awareness data and the device security policies to configure its firewall rules. Monitoring instructions 415 monitors network traffic and uses the firewall rules to control traffic from users based not only on user's client devices but also on the identities and access policies of the users operating the client devices, and to also control traffic from enterprise devices based on security policies of the enterprise devices. In addition to using the identity awareness data to control user traffic at the gateway 400, the gateway 400 may also implement RBAC to enable fine-grained access management according to assigned roles of the users operating the client devices.

In an embodiments, the gateway 400 may also use the identity awareness data to manage dedicated identity-based firewalls within the enterprise, removing the necessity to separately provide identity information at each identity-based firewall and creating a frictionless experience. A technical benefit of this approach is that a newly deployed identity-based firewall may start providing network access control services without depending on a directory agent. Another technical benefit of this approach is that any change to the identity awareness data takes effect across of the distributed identity-based firewalls. It will be appreciated that other enterprises may be similarly configured as the enterprise 125, such as including the gateway that is able to retrieve the identity awareness data from the distributed ledger 120 or from a different distributed ledger.

In an embodiment, the gateway 400 may be programmed to accommodate a wide variety of different communication protocols, such as, for example, HTTP, Real Time Streaming Protocol (RTSP) over HTTP, Secure Socket Shell (SSH), Telnet, Operational Technology (OT) protocols such as MQTT, Modbus, DNP3, and Object linking and embedding for Process Control Unified Architecture (OPC UA), Windows Remote Management (WinRM) or any other applicable protocol, to directly communicate with a client device 140. A client device 140 may provide authentication information to the gateway 400 through an available communication protocol or a client agent installed on the client device 140. The gateway 400 authenticates the client device 140 by comparing the authentication information provided by the client device 140 against the identity awareness data stored in the distributed ledger 120 and applying any RBAC rules. Upon authentication, the gateway 200 allows traffic to and from the authenticated client device 140 through the gateway 400.

The gateway 400 may receive from the authenticated client device 140 identification information of one or more enterprise devices 135 to connect with and, if any, authentication session information accessed from the distributed ledger 120. If authentication session information is not provided by the client device 140, then the gateway 400 determines whether the client device 140 is permitted to communicatively couple with the identified enterprise device 135 using the identity awareness data stored in the distributed ledger 120, RBAC rules, or both. Assuming the client device 140 has permission to access the identified enterprise device 135 based on user access policy, the RBAC rules, or both, the gateway 400 dedicates an available port at the gateway 400 for connection with an identified enterprise device 135 and stores session data relating to this connection as authentication session information in the distributed ledger 120 for subsequent retrieval by the client device 140 and in the local database 405. The gateway 400 may include a Transparent mode or a Layer 2 bridge mode to pass traffic such that the client device 140 may thereafter continue to communicate, through the dedicated port, with the enterprise device 135, as long as the session remains valid. Session data may comprise information relating to communication end points (for example, the network addresses of the client device 140 and the identified enterprise device 135), authentication information, information of the firewall (for example, communication ports), and time information.

In an embodiment, a session may be time-based and automatically expires. In an embodiment, a session may remain valid until active log out from the enterprise device 135 by the user. Multiple available ports on a single gateway 400 may be dedicated for multiple enterprise devices 135 for which the authenticated client device 140 has access to through that gateway 400.

If authentication session information is provided by the authenticated client device 140, then the gateway 400 determines the validity of the session using the local authentication session information and, depending on the validity determination, allows the client device 140 continued access with the enterprise device 135.

Encryption/decryption instructions 420 encrypt outgoing data from and decrypts incoming data to an enterprise device 135 that is in-line with the gateway 400. For example, the gateway 400 may receive incoming data that has been encrypted by a client agent 145 and may decrypt data using the encryption/decryption instructions 420 prior to forwarding the data to the in-line enterprise device 135. The encryption/decryption instructions 420 also encrypt and decrypt traffic from and to an enterprise device 135, according to device security policies. For another example, the encryption/decryption instructions 420 may apply a hash algorithm to and sign the traffic from the enterprise device 135 to ensure data integrity. In some embodiments, since communications to and from the in-line enterprise device 135 go through the gateway 400, the in-line enterprise device 135 may be required to authenticate itself with the gateway 400, such as by providing its fingerprint for comparison by the gateway 400, to ensure the integrity of the in-line enterprise device 135. Encrypted traffic between enterprise devices 135 may be transmitted using a tunneling protocol. A tunnel between two gateways 400 may be configured by an administrator.

4.0 Procedural Overview

Figure 5:
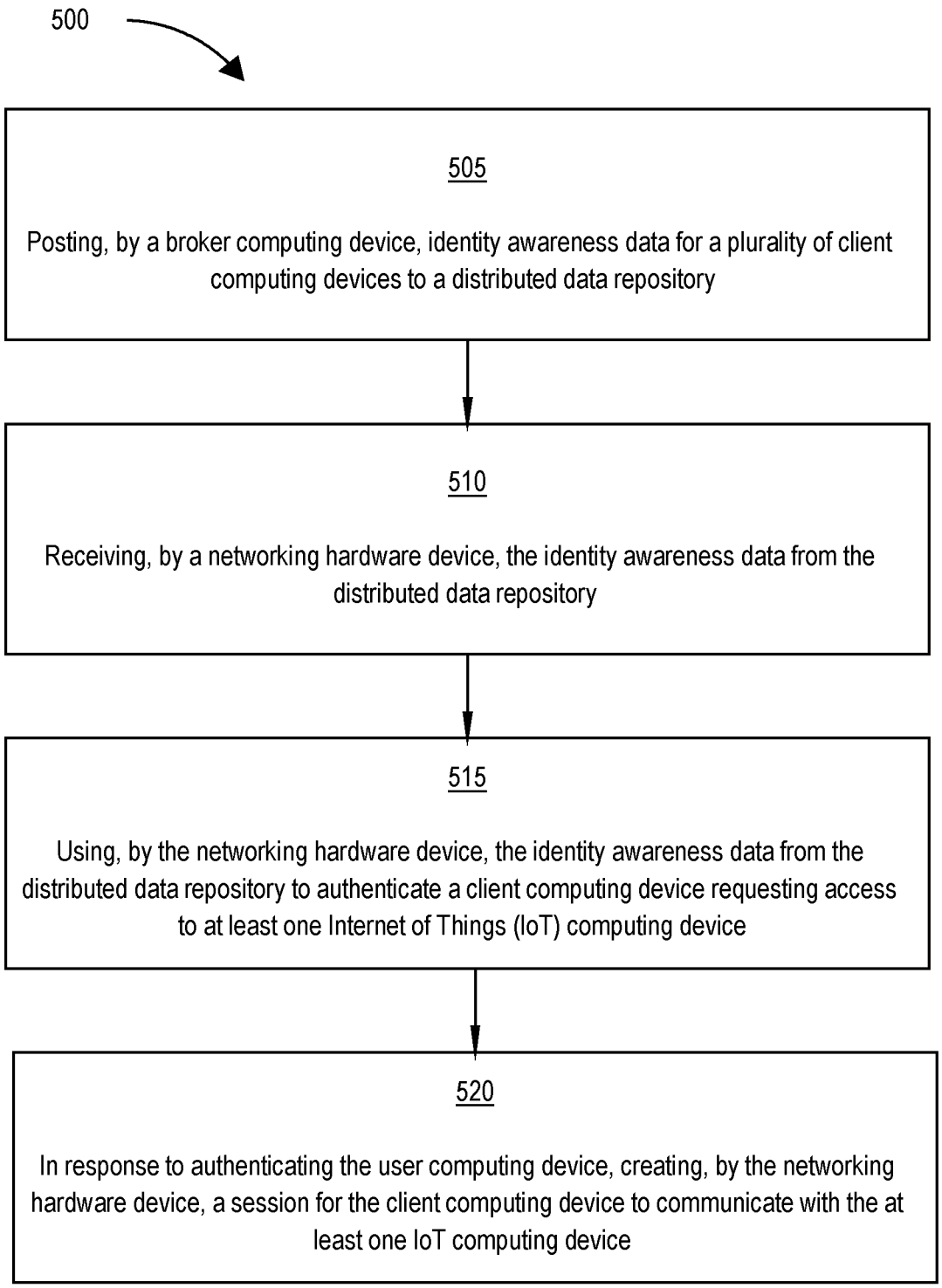
FIG. 5 illustrates an example method for providing access control services in accordance with some embodiments.

FIG. 5 illustrates an example method 500 for providing access control services in accordance with some embodiments. FIG. 5 may be used as a basis to code the method 500 as one or more computer programs or other software elements that the brokers 110 and/or the gateway 130 execute or host. For ease of discussion, the method 500 is described with reference to a single federation and a single enterprise. However, it will be appreciated that the method 500 can be performed for multiple federations and/or multiple enterprises.

The method 500 begins at step 505, where a broker computing device posts identity awareness data for a plurality of client computing devices to a distributed data repository. The identity awareness data may be from a plurality of directory services in a federation. The identity awareness data may be input via a graphical user interface (GUI) of the broker computing device. In an embodiment, the identity awareness data includes identities of users, applications, and/or client device and their corresponding access control policies. The broker computing device generates a hash and encrypts the identity awareness data before posting the identity awareness data to the distributed data repository.

At step 510, a networking hardware device receives the identity awareness data from the distributed data repository. In an embodiment, the networking hardware device is a gateway.

At step 515, the networking hardware device uses the identity awareness data from the distributed data repository to authenticate a client computing device requesting access to at least one enterprise computing device, which may be an Internet of Things (IoT) computing device. In an embodiment, the identity awareness data includes identities of users and access policies of users. In an embodiment, the client computing device is authenticated by using the identities of users to determine whether the client computing device has access through the networking hardware device and by using the access policies of users to determine whether the client computing device has access to the IoT computing device. In an embodiment, the networking hardware device may also apply RBAC rules to restrict network access of the client computing device based on the role of its user within the enterprise. In an embodiment, once the client computing device is authenticated, the client computing device is provided with a token or identity tag to authenticate itself with other networking hardware devices, thereby creating a single sign on experience.

At step 520, in response to authenticating the computing device, the networking hardware device, creates a session for the client computing device to communicate with the at least IoT computing device. In particular, a port on the networking hardware device is opened such that communication between the client computing device and the at least one IoT computing device is through the port. The networking hardware device posts information relating to the session as authentication session information to the distributed data repository and also locally stores the information. The client computing device may access the authentication session information from the distributed data repository and provide this data to the networking hardware device for continued access with the IoT computing device, as long as the session has not expired. The networking hardware device may include a Transparent mode or a Layer 2 mode to pass traffic, as long as the session is valid or authenticated, such that all communications continue uninterrupted. The session may be time-based and automatically expires after a predetermined amount of time or may remain valid until active log out from the IoT computing device. When the session is invalid or not authenticated, the networking hardware device may block traffic between the client computing device and the at least one IoT computing device.

In an embodiment, the broker computing device may also post device security policies of a plurality of enterprise computing devices, such as IoT computing devices, to the distributed data repository, and the networking hardware device may also receive the device security policies from the distributed data repository. In an embodiment, the device security policies specify device controls for the plurality of IoT computing devices, as well encryption/decryption algorithms corresponding with these IoT computing devices. In an embodiment, communications between IoT computing devices are secured. For example, the networking hardware device in-line with an IoT computing device may encrypt outgoing data from the in-line IoT coming device according to the device security policies and transmit the encrypted outgoing data via a tunnel between the networking hardware device and another networking hardware device. The networking hardware device may perform access control on incoming data to the in-line IoT computing device according to the device security policies and, if the incoming data is authorized, then the networking hardware device decrypts the incoming data according to the device security policies prior to forwarding the data to the in-line IoT computing device. In this manner, communications between IoT computing devices are not transmitted in plain text to ensure data integrity and privacy.

Using the foregoing techniques, programmed computers may centrally manage identity awareness data and device security policies and distribute the identity awareness data and the device security policies to be used by a gateway. The present approach utilizes a dedicated broker(s) to receive the identity awareness data and the device security policies and send the data to a distributed data repository. Subsequently, the gateway retrieves the identity awareness data and the device security policies from the distributed data repository, instead of from various sources directly. The identity awareness data and the device security policies automatically take effect on the gateway to control traffic from applications/users and IoT devices. Authentication session information relating to ports opened at the gateway are stored in the distributed data repository. As long as sessions remain valid, the gateway forwards traffic to intended devices. The gateway performs access control on traffic between IoT devices to ensure data integrity and privacy. Implementations provide for a centrally managing authority of data removal of the necessity of, for example, different directory agents, shifting processing burden away from the gateway trying to establish communication with the different directory agents. Implementation also provide for secure access and data between applications/users and IoT devices and between IoT devices. The scalable and distributed nature of a distributed data repository allows user identities and access policies across complex federations involving multiple overlapping enterprises, as well as device security policies to be configured or updated at the gateway, without intervention by an administrator.

Furthermore, the approaches disclosed herein improve data security and data integrity. The use of a distributed data repository protects the integrity of any data stored in the distributed data repository. The nature of the distributed data repository also ensures that each new block of data is linked to the previous block, creating an improved method of documenting changes and rejecting unapproved changes. Consequently, the distributed data repository functions as a secure backup for sensitive awareness data with high Byzantine fault tolerance.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
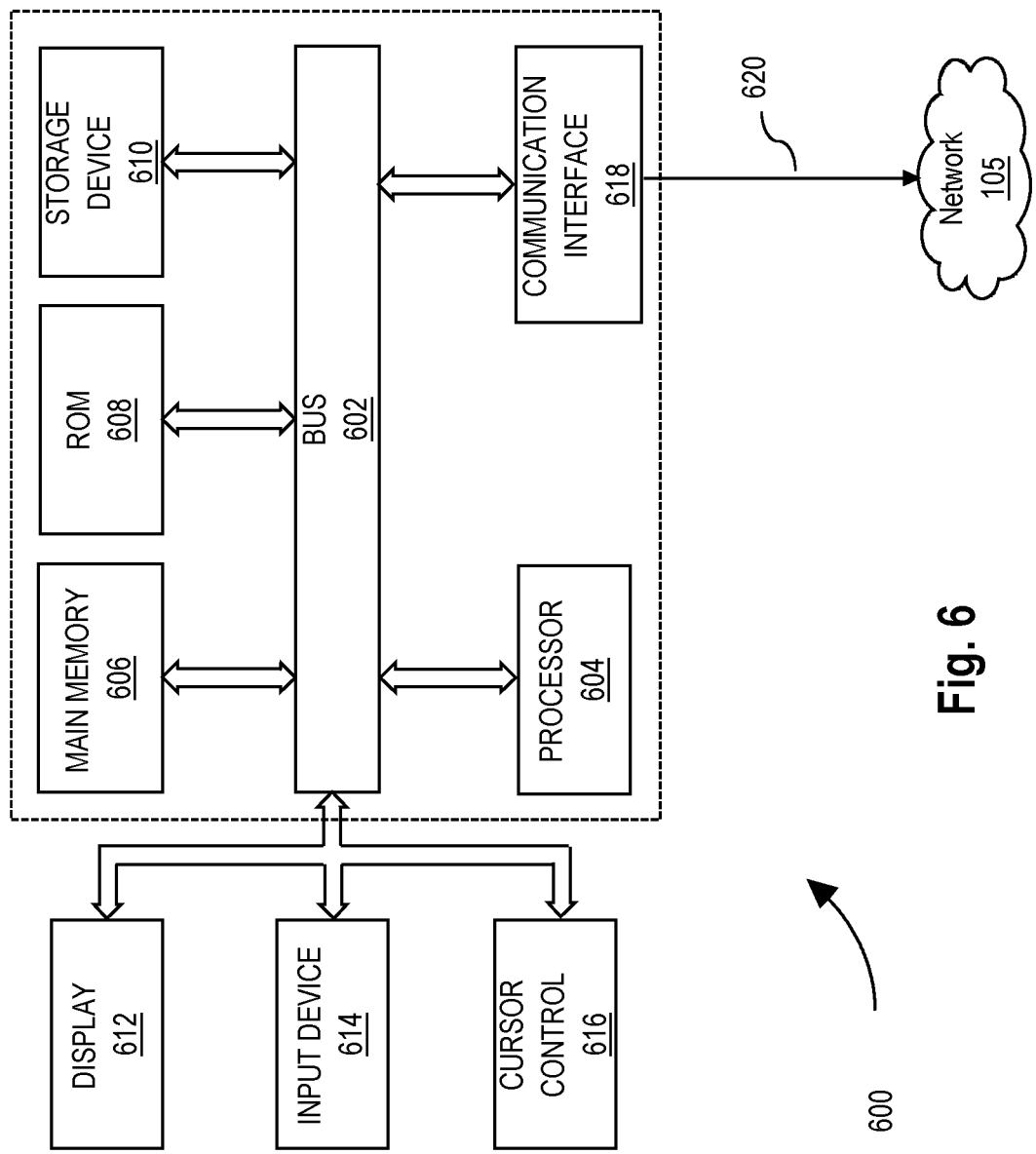
FIG. 6 illustrates an example block diagram of a computer system upon which an embodiment of the invention may be implemented.

FIG. 6 illustrates an example block diagram of a computer system 600 upon which an embodiment of the invention may be implemented. Computer system 600 includes a bus 602 or other communication mechanism for communicating information, and a hardware processor 604 coupled with the bus 602 for processing information. The hardware processor 604 may be, for example, a general-purpose microprocessor.

The computer system 600 also includes a main memory 606, such as a random-access memory (RAM) or other dynamic storage device, coupled to the bus 602 for storing information and instructions to be executed by the processor 604. The main memory 606 also may be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a cathode ray tube (CRT), a liquid crystal display (LCD), or any other display for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (for example, x) and a second axis (for example, y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a telephone line using a modem. A modem local to the computer system 600 can receive the data on the telephone line and use an infra-red transmitter to convert the data to an infra-red signal. An infra-red detector can receive the data carried in the infra-red signal and appropriate circuitry can place the data on the bus 602. The bus 602 carries the data to the main memory 606, from which processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a network, such as the network 105 of FIG. 1. For example, the communication interface 618 may be an integrated services digital network (ISDN) card, cable modem, satellite modem, or a modem to provide a data communication connection to a corresponding type of telephone line. As another example, the communication interface 618 may be a local area network (LAN) card to provide a data communication connection to a compatible LAN. Wireless links may also be implemented. In any such implementation, the communication interface 618 sends and receives electrical, electromagnetic or optical signals that carry digital data streams representing various types of information.

The network link 620 typically provides data communication through one or more networks 105 to other computing systems. The computer system 600 can send messages and receive data, including transaction data, through the network 105, the network link 620 and the communication interface 618.

6.0 Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    posting, by a broker computing device, identity awareness data for a plurality of client computing devices to a distributed data repository;
    posting, by the broker computing device, device security policies of a plurality of IoT computing devices to the distributed data repository;
    receiving, by a networking hardware device, the identity awareness data from the distributed data repository;
    using, by the networking hardware device, the identity awareness data from the distributed data repository to authenticate a client computing device requesting access to at least one Internet of Things (IoT) computing device;

receiving, by the networking hardware device, the device security policies from the distributed data repository and using the received device security policies to establish firewall rules at the networking hardware device;

in response to authenticating the client computing device, creating, by the networking hardware device, a session for the client computing device to communicate with the at least one IoT computing device, wherein creating a session comprises:

opening a port on the networking hardware device, wherein communication between the client computing device and the at least one IoT computing device is through the port;

posting information relating to the session as authentication session information to the distributed data repository.

2. The method of claim 1, wherein the identity awareness data includes identities of users and access policies of users, wherein authenticating the client computing device comprises using the identities of users to determine whether the client computing device has access through the networking hardware device and using the access policies of users to determine whether the client computing device has access to the at least one IoT computing device.

3. The method of claim 1, further comprising:

encrypting, by the networking hardware device, outgoing data from the at least one IoT computing device according to the device security policies;

transmitting, by the networking hardware device, the outgoing data that has been encrypted via a tunnel between the networking hardware device and another networking hardware device.

4. The method of claim 1, further comprising performing, by the networking hardware device, access control on incoming data to the at least one IoT computing device according to the device security policies.

5. The method of claim 1, further comprising decrypting, by the networking hardware device, incoming data according to the device security policies.

6. The method of claim 1, further comprising:

using the networking hardware device, allowing traffic between the client computing device and the at least one IoT computing device when the session is authenticated;

using the networking hardware device, blocking the traffic between the client computing device and the at least one IoT computing device when the session is not authenticated.

7. One or more non-transitory machine-readable storage media storing one or more sequences of program instructions which, when executed by one or more computing devices, cause performing:

posting, by a broker computing device, identity awareness data for a plurality of client computing devices to a distributed data repository;

posting, by the broker computing device, device security policies of a plurality of IoT computing devices to the distributed data repository;

receiving, by a networking hardware device, the identity awareness data from the distributed data repository;

using, by the networking hardware device, the identity awareness data from the distributed data repository to authenticate a client computing device requesting access to at least one Internet of Things (IoT) computing device;

receiving, by the networking hardware device, the device security policies from the distributed data repository and using the received device security policies to establish firewall rules at the networking hardware device;

in response to authenticating the client computing device, creating, by the networking hardware device, a session for the client computing device to communicate with the at least one IoT computing device, wherein creating a session comprises:

opening a port on the networking hardware device, wherein communication between the client computing device and the at least one IoT computing device is through the port;

posting information relating to the session as authentication session information to the distributed data repository.

8. The one or more non-transitory machine-readable storage media of claim 7, wherein the identity awareness data includes identities of users and access policies of users, wherein authenticating the client computing device comprises using the identities of users to determine whether the client computing device has access through the networking hardware device and using the access policies of users to determine whether the client computing device has access to the at least one IoT computing device.

9. The one or more non-transitory machine-readable storage media of claim 7, further comprising instructions that, when executed by one or more computing devices, cause:

encrypting, by the networking hardware device, outgoing data from the at least one IoT computing device according to the device security policies;

transmitting, by the networking hardware device, the outgoing data that has been encrypted via a tunnel between the networking hardware device to another networking hardware device.

10. The one or more non-transitory machine-readable storage media of claim 7, further comprising instructions that, when executed by one or more computing devices, cause performing, by the networking hardware device, access control on incoming data to the at least one IoT device according to the device security policies.

11. The one or more non-transitory machine-readable storage media of claim 7, further comprising instructions that, when executed by one or more computing devices, cause decrypting, by the networking hardware device, incoming data according to the device security policies.

12. The one or more non-transitory machine-readable storage media of claim 7, further comprising instructions that, when executed by one or more computing devices, cause:

using the networking hardware device, allowing traffic between the client computing device and the at least one IoT computing device when the session is authenticated;

using the networking hardware device, blocking the traffic between the client computing device and the at least one IoT computing device when the session is not authenticated.

13. A computer system comprising:

a distributed data repository;

a broker computing device communicatively coupled with the distributed data repository, wherein the broker computing device comprises a first non-transitory data storage medium storing a first set of instructions which, when executed by the broker computing device, cause:
  posting identity awareness data for a plurality of client computing devices to the distributed data repository;
  posting device security policies of a plurality of IoT computing devices to the distributed data repository;
a networking hardware device communicatively coupled with the distributed data repository, wherein the networking hardware device comprises a second non-transitory data storage medium storing a second set of instructions which, when executed by the networking hardware device, cause:
  receiving the identity awareness data from the distributed data repository;
  using the identity awareness data from the distributed data repository to authenticate a client computing device requesting access to at least one Internet of Things (IoT) computing device;
  receiving the device security policies from the distributed data repository and using the received device security policies to establish firewall rules at the networking hardware device;
  in response to authenticating the client computing device, creating a session for the client computing device to communicate with the at least one IoT computing device, wherein creating a session comprises:
    opening a port on the networking hardware device, wherein communication between the client computing device and the at least one IoT computing device is through the port;
    posting information relating to the session as authentication session information to the distributed data repository.

14. The computer system of claim 13, wherein the identity awareness data includes identities of users and access policies of users, wherein authenticating the client computing device comprises using the identities of users to determine whether the client computing device has access through the networking hardware device and using the access policies of users to determine whether the client computing device has access to the at least one IoT computing device.

15. The computer system of claim 13, wherein the second non-transitory data storage medium storing the second set of instructions which, when executed by the networking hardware device, further cause:
  encrypting outgoing data from the at least one IoT computing device according to the device security policies;
  transmitting the outgoing data that has been encrypted via a tunnel between the networking hardware device to another networking hardware device.

16. The computer system of claim 13, wherein the second non-transitory data storage medium storing the second set of instructions which, when executed by the networking hardware device, further cause:
  performing access control on incoming data to the at least one IoT computing device according to the device security policies;
  decrypting the incoming data according to the device security policies.

17. The computer system of claim 13, wherein the second non-transitory data storage medium storing the second set of instructions which, when executed by the networking hardware device, further cause:
  allowing traffic between the client computing device and the at least one IoT computing device when the session is authenticated;
    blocking the traffic between the client computing device and the at least one IoT computing device when the session is not authenticated.

* * * * *